(12) United States Patent
Sarti et al.

(10) Patent No.: US 12,412,393 B2
(45) Date of Patent: Sep. 9, 2025

(54) SYSTEMS AND METHODS FOR DETERMINING WHEN TO RELABEL DATA FOR A MACHINE LEARNING MODEL

(71) Applicant: Verizon Patent and Licensing Inc., Basking Ridge, NJ (US)

(72) Inventors: Leonardo Sarti, Florence (IT); Andrea Benericetti, Prato (IT)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 316 days.

(21) Appl. No.: 18/321,589

(22) Filed: May 22, 2023

(65) Prior Publication Data

US 2024/0395038 A1 Nov. 28, 2024

(51) Int. Cl.
*G06V 20/40* (2022.01)
*G06V 10/774* (2022.01)
*G06V 10/778* (2022.01)

(52) U.S. Cl.
CPC ............ *G06V 20/44* (2022.01); *G06V 10/774* (2022.01); *G06V 10/7788* (2022.01)

(58) Field of Classification Search
None
See application file for complete search history.

(56) References Cited

U.S. PATENT DOCUMENTS

| | | | | |
|---|---|---|---|---|
| 11,586,987 | B2* | 2/2023 | Szanto | G06N 20/20 |
| 12,159,451 | B2* | 12/2024 | White | G06V 20/56 |
| 2018/0373980 | A1* | 12/2018 | Huval | G06F 18/41 |
| 2022/0164370 | A1* | 5/2022 | Yuan | G06F 40/30 |

* cited by examiner

*Primary Examiner* — David Ometz

(57) ABSTRACT

A device may receive video data identifying videos, and may process the video data with a machine learning model, to determine classifications. The device may generate labels for the videos, and may calculate event severity scores and event severity labels. The device may calculate event severity incoherence scores, and may calculate user feedback scores of users associated with the device. The device may determine reviewer mistrust scores, and may calculate time review scores. The device may calculate reviewer bias scores, and may determine relabeling scores for the videos based on the event severity incoherence scores, the user feedback scores, the reviewer mistrust scores, the time review scores, and the reviewer bias scores. The device may generate new labels for one or more of the videos based on the relabeling scores, and may retrain the machine learning model, with the new labels, to generate a retrained machine learning model.

20 Claims, 13 Drawing Sheets

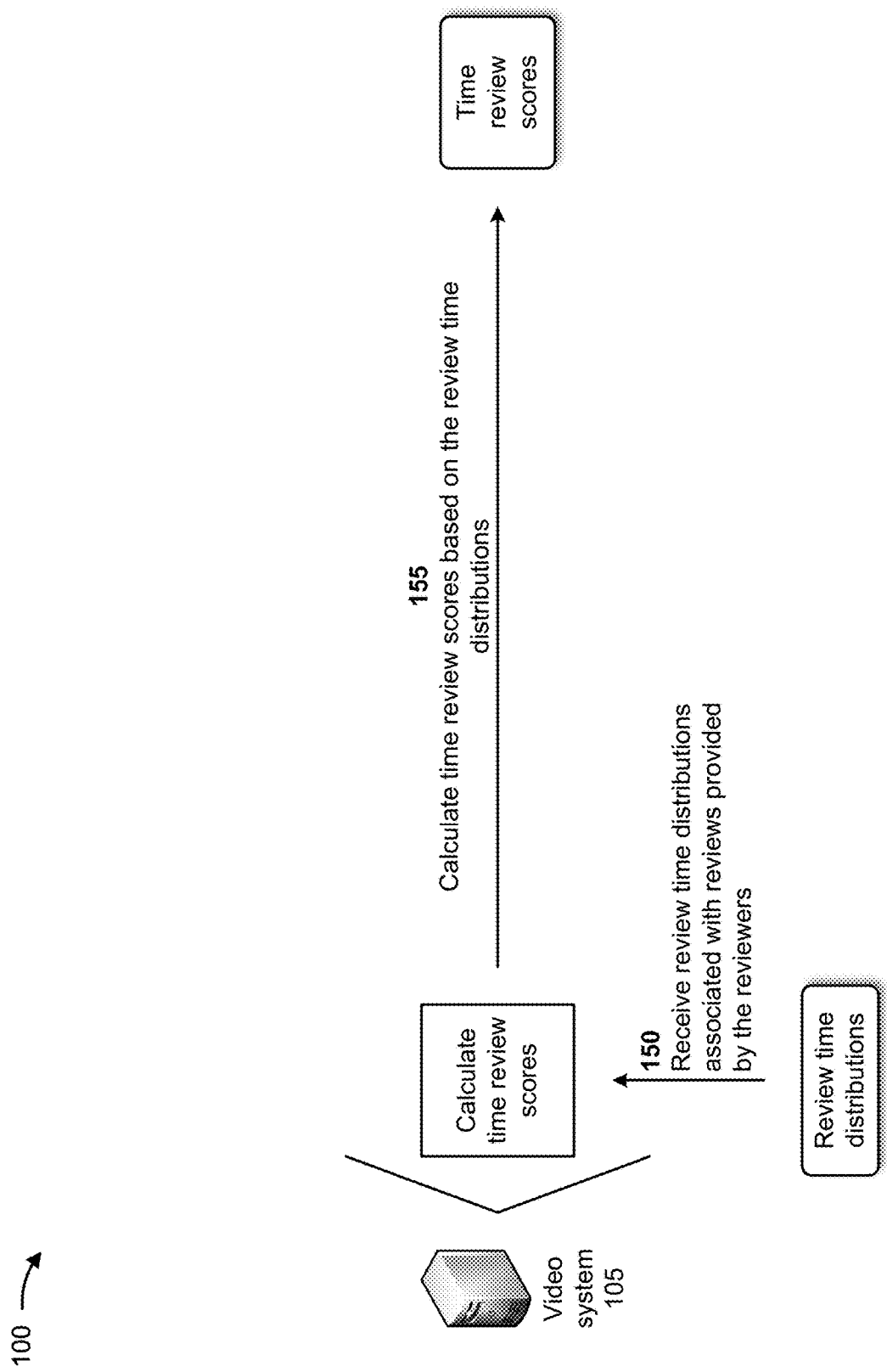

SYSTEMS AND METHODS FOR DETERMINING WHEN TO RELABEL DATA FOR A MACHINE LEARNING MODEL

BACKGROUND

With the rise of deep learning, obtaining substantial amounts of labeled data has become increasingly important in any machine learning system.

BRIEF DESCRIPTION OF THE DRAWINGS

FIGS. 1A-1I are diagrams of an example associated with determining when to relabel data, and relabeling data, for a machine learning model.

DETAILED DESCRIPTION OF EXAMPLE EMBODIMENTS

Figure 1A:
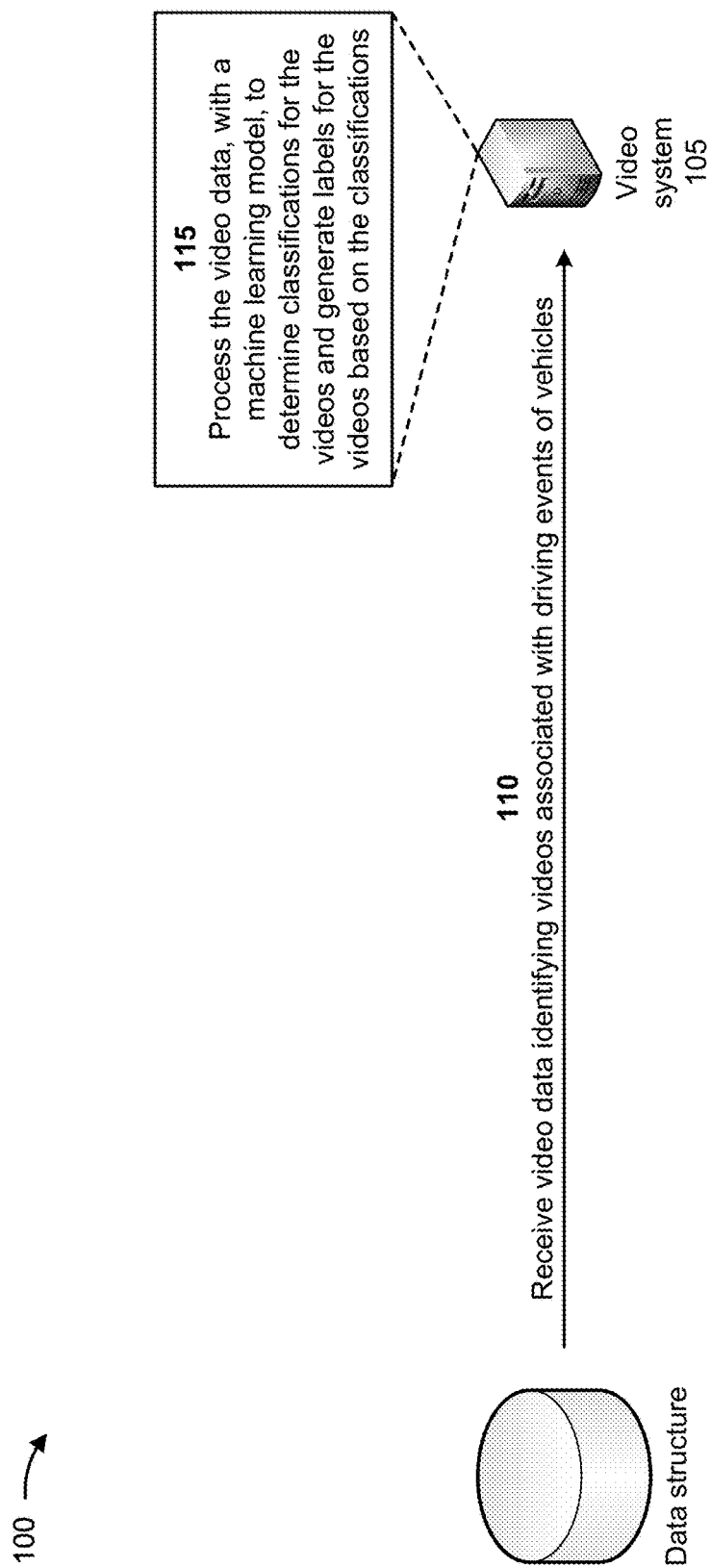

The following detailed description of example implementations refers to the accompanying drawings. The same reference numbers in different drawings may identify the same or similar elements.

Labeled data, for use in training a machine learning model, may include manually annotated target data (e.g., input data that, once trained, the machine learning model may be able to output). For example, such manual labels may include classification labels (e.g., in image classification tasks), bounding boxes (e.g., in object detection tasks), pixel-level annotations (e.g., in semantic segmentation tasks), translations to a different language (e.g., in machine translation tasks), and/or the like. In general, obtaining data for a machine learning model may be inexpensive. However, labeled data is significantly more difficult, as labeling the data for the machine learning model is a manual task performed by human specialists and therefore may be prone to error. Thus, labeling data is significantly time consuming and often inaccurate. Current techniques for labeling data for a machine learning model therefore consume computing resources (e.g., processing resources, memory resources, communication resources, and/or the like), networking resources, and/or other resources when failing to generate accurate labels (e.g., a trustable ground truth) for the machine learning model, failing to quickly iterate through the labeling process (which generates more labels for training the machine learning model), generating an erroneous machine learning model based on inaccurate labels, generating erroneous outputs with the erroneous machine learning model, and/or the like.

Some implementations described herein provide a video system that determines when to relabel data, and relabeling data, for a machine learning model. For example, the video system may receive video data identifying videos associated with driving events of vehicles, and may process the video data, with a machine learning model, to determine classifications for the videos. The video system may generate labels for the videos based on the classifications, and may calculate event severity scores and event severity labels based on the classifications and the labels. The video system may calculate event severity incoherence scores based on the event severity scores and the event severity labels, and may calculate user feedback scores based on feedback votes and suggested event severities provided by users associated with the device. The video system may determine reviewer mistrust scores based on a quantity of incorrect reviews and a quantity of all reviews provided by reviewers, and may calculate time review scores based on review time distributions associated with reviews provided by the reviewers. The video system may calculate reviewer bias scores based on reviewer label bias and a quantity of the labels, and may determine relabeling scores for the videos based on the event severity incoherence scores, the user feedback scores, the reviewer mistrust scores, the time review scores, and the reviewer bias scores. The video system may generate one or more new labels for one or more of the videos based on the relabeling scores for the videos, and may store the one or more new labels in a data structure that includes the labels that are not replaced with the one or more new labels. The video system may retrain the machine learning model, with the one or more new labels, to generate a retrained machine learning model.

In this way, the video system determines when to relabel data, and relabeling data, for a machine learning model. For example, the video system may identify mislabeled data for the machine learning model, may correct the mislabeled data, and may retrain the machine learning model with the correctly labeled data. In some implementations, the video system may determine whether a video, that is already classified and labeled, needs to be reviewed again to correct an initial label (e.g., mislabeling) or to reinforce a label (e.g., due to misclassification). The video system may determine whether the video needs to be reviewed again based on expertise of reviewers providing labels for videos, customer feedback on outputs of the machine learning model, intrinsic label information, and/or the like. The video system may correct mislabeled data based on reviewing the video, and may retrain the machine learning model with the correctly labeled data. Thus, the video system may conserve computing resources, networking resources, and/or other resources that would have otherwise been consumed by failing to generate accurate labels for the machine learning model, failing to quickly iterate through the labeling process which generates more labels for training the machine learning model, generating an erroneous machine learning model based on inaccurate labels, generating erroneous outputs with the erroneous machine learning model, and/or the like.

FIGS. 1A-1I are diagrams of an example 100 associated with determining when to relabel data, and relabeling data, for a machine learning model. As shown in FIGS. 1A-1I, example 100 includes a video system 105 associated with a data structure. The video system 105 may include a system that determines when to relabel data, and relabeling data, for a machine learning model. The data structure may include a database, a table, a list, and/or the like. Further details of the video system 105 and the data structure are provided elsewhere herein.

As shown in FIG. 1A, and by reference number 110, the video system 105 may receive video data identifying videos associated with driving events of vehicles. For example, dashcams or other video devices of vehicles may record video data (e.g., video footage) of events associated with the vehicles. The video data may be recorded based on a trigger associated with the events. For example, a harsh event may be triggered by an accelerometer mounted inside a vehicle (e.g., a kinematics trigger). Alternatively, a processing device of a vehicle may include a machine learning model that detects a potential danger for the vehicle and requests further processing to obtain the video data. Alternatively, a driver of a vehicle may cause the video data to be captured at a moment that the event occurs. The vehicles or the video devices may transfer the video data to a data structure (e.g., a database, a table, a list, and/or the like). This process may be repeated over time so that the data structure includes video data identifying videos associated with driving events (e.g., for the vehicles and/or the drivers of the vehicles). In some implementations, the video data may be processed by several machine learning models that output severity scores of events (e.g., distinguishing between a critical event, a major event, a moderate event, and a minor event) and a set of additional attributes associated with the events (e.g., a presence or an absence of tailgating, a stop sign violation, a rolling stop at a traffic light, and/or the like). The machine learning models may be associated with severities and the set of additional attributes with the video data in the data structure.

In some implementations, the video system 105 may continuously receive the video data identifying videos associated with driving events from the data structure, may periodically receive the video data identifying videos associated with driving events from the data structure, and/or may receive the video data identifying videos associated with driving events from the data structure based on requesting the video data from the data structure.

As further shown in FIG. 1A, and by reference number 115, the video system 105 may process the video data, with a machine learning model, to determine classifications for the videos and may generate labels for the videos based on the classifications. For example, the video system 105 may include machine learning models. Each machine learning model may focus on a particular domain, may classify each of the videos within the particular domain, and may assign a label to each of the videos based on the classifications. As an example, the machine learning models may assign the following risk-related labels based on an analysis of the video data (e.g., where a "0" indicates a low risk, a "1" indicates a mild violation (a mild risk), a "2" indicates a severe violation (a high risk), and a "3" indicates a collision): a tailgating severity label (e.g., 0, 1, or 2), a stop sign violation severity label (e.g., 0, 1, 2, or 3), a minor severity confidence label (e.g., from 0 to 1), a moderate severity confidence label (e.g., from 0 to 1), a major severity confidence label (e.g., from 0 to 1), a critical severity confidence label (e.g., from 0 to 4), a presence of a vulnerable road user (VRU) label (e.g., 0, 1, or 2), and/or the like. In some implementations, the video system 105 may receive telematics data associated with the video data, and may process the video data and the telematics data, with the machine learning model, to determine classifications for the videos. The telematics data may include data identifying vehicle speeds associated with the videos, vehicle braking associated with the videos, weather conditions associated with the videos, and/or the like.

In some implementations, the video system 105 may include other models that assign additional labels to each of the videos. The additional labels may not be related to a safety condition of an event, but may be utilized to determine a risk score and/or a similarity of a video with other videos. For example, the additional labels may include a time of the day label (e.g., extracted from metadata or related to lightning conditions, such as night, dawn, time of day, or twilight), a weather condition label (e.g., sunny, overcast, rainy, foggy, or snowy), a road characteristics label (e.g., a quantity of lanes in a road, a one-way road versus a two-way road, or a road type), a road conditions label (e.g., dry, wet, or snowy), a traffic conditions label (e.g., a vehicle speed or a quantity and a distance of the vehicle from surrounding vehicles), and/or the like. In some implementations, the video system 105 may provide the videos for display (e.g., via user devices) to reviewers. The reviewers may, for each video, generate ground-truth labels for several subtasks of the video, including event severity, weather conditions, presence of traffic violations, and/or the. The reviewers may provide the ground-truth labels to the video system 105 (e.g., via user devices) and the video system 105 may receive the ground-truth labels.

Figure 1B:
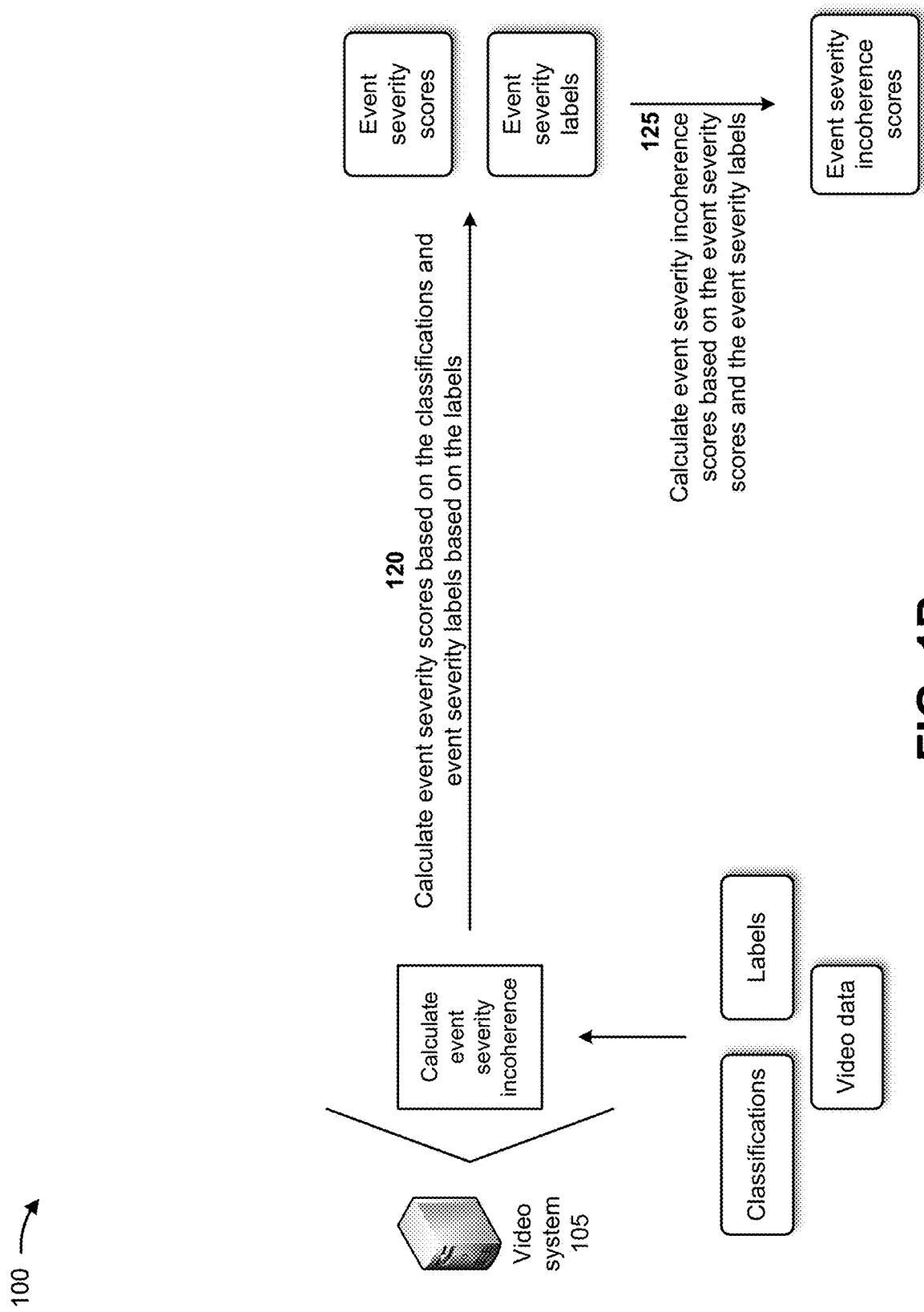

As shown in FIG. 1B, and by reference number 120, the video system 105 may calculate event severity scores based on the classifications and event severity labels based on the labels. To identify if a video, already classified and labeled, needs to be reviewed again to correct an initial label (e.g., due to mislabeling) or to reinforce the initial label (e.g., due to misclassification), the video system 105 may examine available information, such as reviewer expertise, user feedback, intrinsic label information, and/or the like. The video system 105 may represent scores of each severity class with a single value based on the event severity scores. In one example, the video system 105 may calculate an event severity score (EvSevScore) for a video based on a classification, as follows:

$$EvSevScore = (\text{lowrisk\_score} + 2*\text{midrisk\_score} + 3*\text{highrisk\_score} + 4*\text{collision\_score})/4,$$

where, for example, a "0" indicates a low risk score, a "1" indicates a mid-risk score, a "2" indicates a high risk score, and a "3" indicates a collision score. The greater the event risk score, the greater a risk will be associated with a video.

On the other hand, the video system 105 may utilize the generated or received labels for the videos. In one example, the video system 105 may calculate an event severity label (EvSevLabel) for a video based on a corresponding label, as follows:
low-risk=1
mid-risk=2
high-risk=3
collision=4

The video system 105 may plot the event severity scores and the event severity labels in a two-dimensional plot. The two-dimensional plot may include regions where data has a higher density, and regions where data has a lower density. The video system 105 may identify the regions where the data has a lower density since such regions may indicate event severity incoherence, as described below.

As further shown in FIG. 1B, and by reference number 125, the video system 105 may calculate event severity incoherence scores based on the event severity scores and the event severity labels. For example, after identifying the regions of the two-dimensional plot where the data has a lower density, the video system 105 may utilize the identified regions to calculate event severity incoherence scores based on the event severity scores and the event severity labels associated with the regions. In some implementations, the video system 105 may calculate the event severity incoherence scores based on distances between the event severity scores and the event severity labels in the identified regions. For example, the video system 105 may calculate an event severity incoherence score (EvSevIncoherence) based on a distance (d), as follows:

$$EvSevIncoherence(x) = \sum_{x_j \in X} d(x, x_j),$$

where the distance d may be a distance measure, such as a Euclidean distance, and X is a set of all data points with coordinates x=(EvSevScore, EvSevLabel). The event severity incoherence score may provide a measure for how close each point x is to a high density cluster, where the greater the value of a point indicates a more isolated point. Isolated points may indicate interesting videos for the video system 105 to review since such videos may be mislabeled, misclassified, or associated with corner cases not identified by the machine learning model.

Figure 1C:
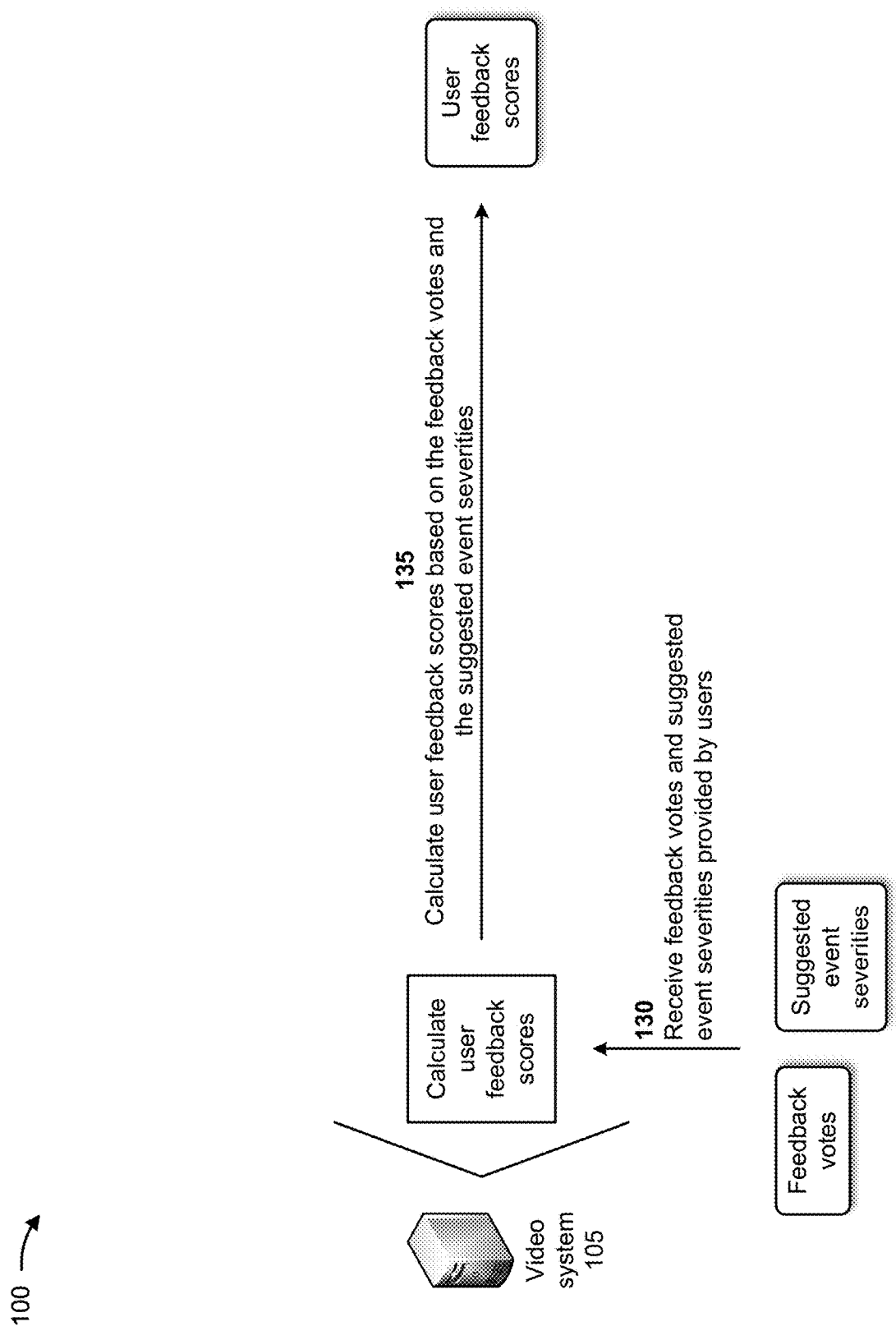

As shown in FIG. 1C, and by reference number 130, the video system 105 may receive feedback votes and suggested event severities provided by users of the video system 105. For example, the video system 105 may receive feedback from users of the video system 105, such as feedback associated with the classifications assigned to the videos of the video data. In some implementations, the feedback from users for a video may include a feedback vote value (FeedbackVote) (e.g., a value from one to five stars) for the video and a suggested event severity value (SuggSev) for the video. With these values, the video system 105 may determine a severity of a label error associated with the video (e.g., a user feedback score UsrfScore), as described below.

As further shown in FIG. 1C, and by reference number 135, the video system 105 may calculate user feedback scores based on the feedback votes and the suggested event severities. For example, the video system 105 may utilize the feedback votes (FeedbackVote) and the suggested event severities (SuggSev) to calculate user feedback scores (UsrfScore). In some implementations, the video system 105 may calculate the user feedback scores (UsrfScore) as follows:

$$UsrfScore(x) = (1 - FeedbackVote(x)/5) * |EvSevLabel(x) - SuggSev(x)|/3,$$

where the first term provides a weight to the feedback votes (FeedbackVote) (e.g., a lower feedback vote may generate a greater first term). The second term may increase as distances between the event severity labels (EvSevLabel) and the suggested event severities (SuggSev) increase. For example, the second term may attain a maximum value (e.g., one) when the event severity label is "low-risk" (e.g., a value of one) and the suggested event severity "collision" (e.g., a value of four). When the event severity label (EvSevLabel) is equivalent to the suggested event severity (SuggSev), the user feedback score (UsrfScore) may be zero, nullifying the whole score. In some implementations, the user feedback score (UsrfScore) may range from zero to one.

Figure 1D:
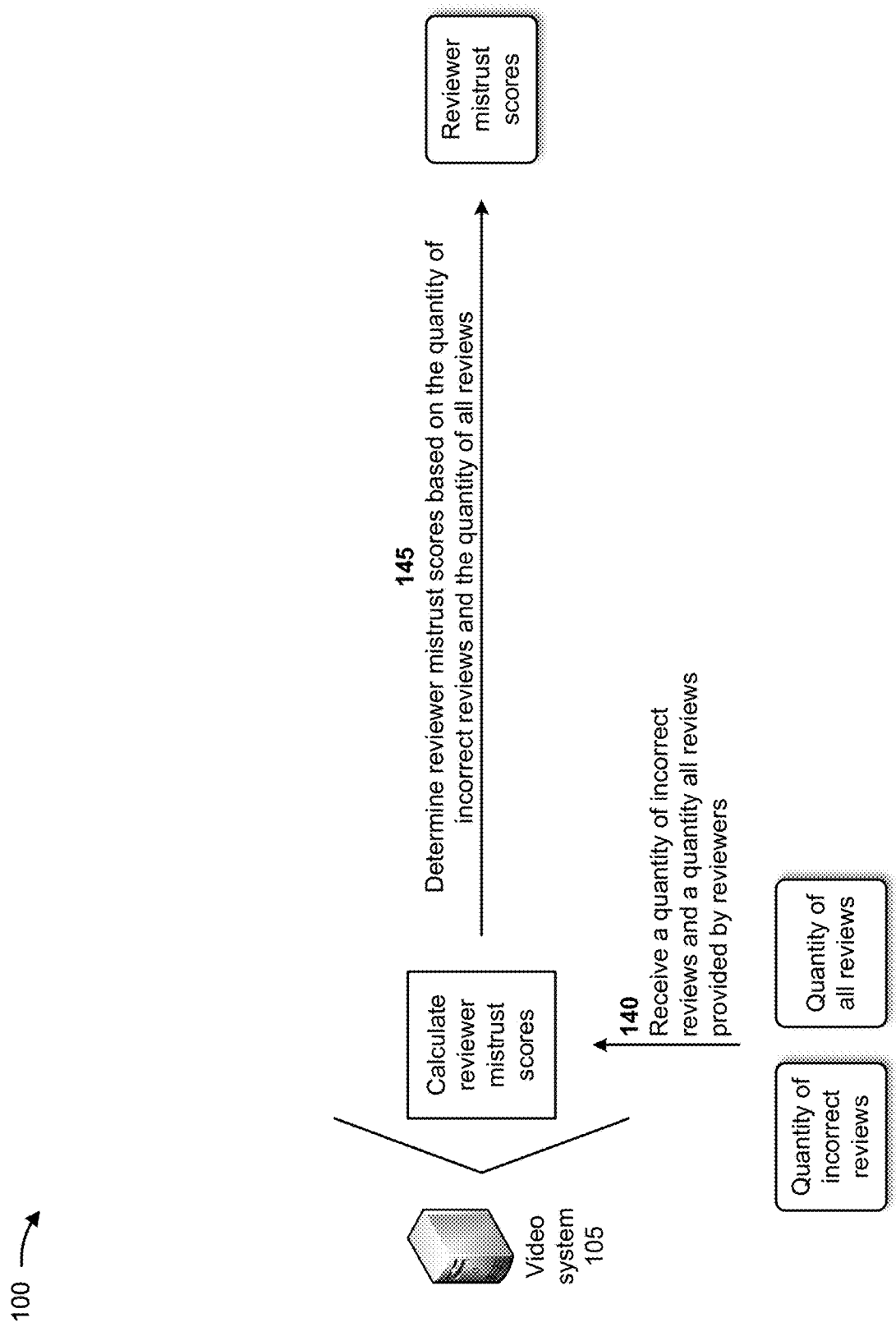

As shown in FIG. 1D, and by reference number 140, the video system 105 may receive a quantity of incorrect reviews and a quantity of all reviews provided by reviewers. For example, for each label, the video system 105 may receive or identify a quantity of reviews that are different than the label (num_of_wrong_reviews) and a quantity of all reviews for the label (num_of_all_reviews). The video system 105 may utilize the quantity of incorrect reviews and the quantity of all reviews by the reviewers to determine reviewer mistrust scores, as described below.

As further shown in FIG. 1D, and by reference number 145, the video system 105 may determine reviewer mistrust scores based on the quantity of incorrect reviews and the quantity of all reviews. For example, for each label, the video system 105 may calculate a reviewer mistrust score (RevMistrust) based on the quantity of incorrect reviews (num_of_wrong_reviews) and the quantity of all reviews (num_of_all_reviews), as follows:

$$RevMistrust(x) = num\_of\_wrong\_reviews/(num\_of\_all\_reviews/2).$$

Since each label may be based on a majority of votes by reviewers, the quantity of incorrect reviews (num_of_wrong_reviews) cannot be greater than half of the quantity of all reviews (num_of_all_reviews). Thus, the video system 105 may normalize (e.g., by half) the quantity of all reviews (num_of_all_reviews) to obtain a reviewer mistrust score (RevMistrust) between zero and one. The reviewer mistrust score (RevMistrust) may exceed one only if all reviews are different. In one example, the video system 105 may generate the following reviewer mistrust scores:

| Label | Review 1 | Review 2 | Review 3 | Review 4 | Wrong Reviews | All Reviews | Rev Mistrust Score |
| --- | --- | --- | --- | --- | --- | --- | --- |
| low-risk | low-risk | low-risk | | | 0 | 2 | 0 |
| mid-risk | mid-risk | mid-risk | high-risk | | 1 | 3 | 0.66 |
| mid-risk | mid-risk | low-risk | mid-risk | collision | 2 | 4 | 1 |
| collision | collision | low-risk | collision | collision | 1 | 4 | 0.5 |

As shown in FIG. 1E, and by reference number 150, the video system 105 may receive review time distributions associated with reviews provided by the reviewers. For example, a review of a video may include providing multiple (e.g., from five to ten) different annotations by a reviewer. Sometimes a video may be simple to review and may require seconds of review time by the reviewer. On the other hand, a video may be very challenging and doubtful to review and may require the reviewer to rewatch the video multiple times and pause the video during crucial moments to understand the video. In such instances, the reviewer may require minutes to review the video. In one example, if a review time is two seconds or eight minutes, the video system 105 may identify videos associated with such review times as being suspicious and may be requiring relabeling. To consider a time required to review a video, the video system 105 may model a distribution of review times via two normal curves with parameters:

N1: N (location=1, scale=0.2)/2, if x<1 and 0 elsewhere; and

N2: N (location=1, scale=0.4), if x≥1 and 0 elsewhere.

The location and the scale may be referred to as mu and sigma. The video system 105 may divide the first Gaussian curve (N1) by two to form a continuous curve between the first Gaussian curve (N1) and the second Gaussian curve (N2).

As further shown in FIG. 1E, and by reference number 155, the video system 105 may calculate time review scores based on the review time distributions. For example, a time review score (TimeReviewScore) may provide importance to a time required to perform a review of a video. The video system 105 may utilize the first Gaussian curve (N1) and the second Gaussian curve (N2) (e.g., the review time distributions) to provide a model that considers long annotation times and short annotation times. In some implementations, the video system 105 may calculate time review scores based on the review time distributions, as follows:

$$TimeReviewScore(x) = 1 - (N1(x) + N2(x)).$$

The time review score calculation may include an application of the model, using a time required to review a video x as an input to the model. A time review score may range from zero to one and may be maximized when x is very low (e.g., below thirty seconds) or very high (e.g., above two minutes).

Figure 1F:
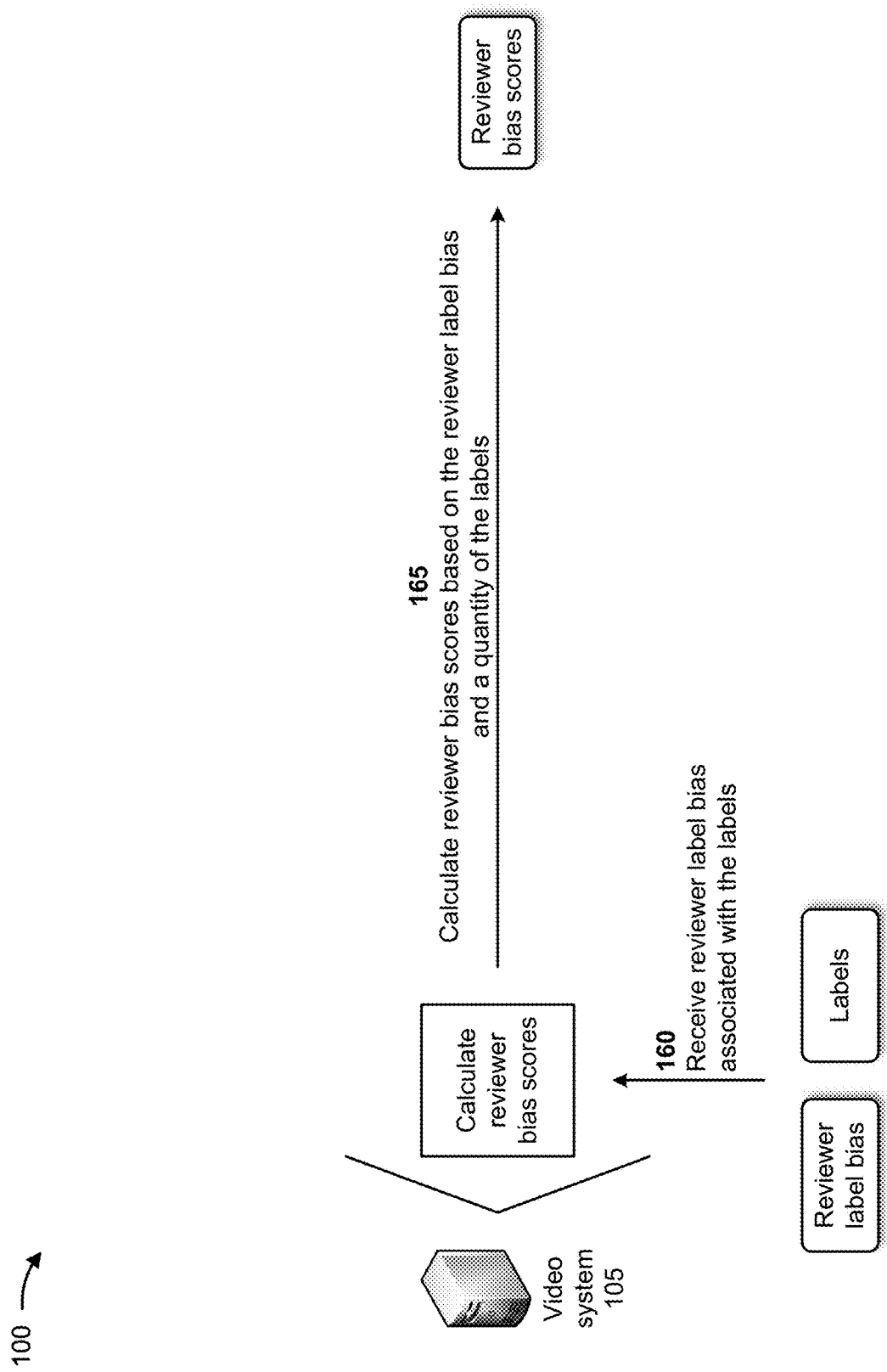

As shown in FIG. 1F, and by reference number 160, the video system 105 may receive reviewer label bias associated with the labels. For example, if a reviewer performs labeling every day for months, a label annotation distribution may shift for some reason (e.g., due to adjusting or changing criteria, reducing a focus level, and/or the like). These shifts or biases need to be identified and fixed as soon as possible by the video system 105. For example, each reviewer may receive a reviewer label bias (e.g., ReviewerLabelBias) associated with labels. The video system 105 may utilize the review label bias to determine whether the reviewer is effectively biased in order to properly weight label annotations of the reviewer when the label annotations are aggregated.

As further shown in FIG. 1F, and by reference number 165, the video system 105 may calculate reviewer bias scores based on the reviewer label bias and a quantity of the labels. For example, the video system 105 may define a reviewer bias score (ReviewerBias) on a specific video x as a normalized sum of every bias of the reviewer for every label, as follows:

$$ReviewerBias(x) = $$

$$\sum\nolimits_{review, label \in L(x) \text{ and } review \leftrightarrow label} ReviewerLabelBias(review, label)/|L|,$$

where L(x) is a set (e.g., a quantity of labels) of all labels for a video x, and ReviewerLabelBias(review, label)=∥distr_last_month(review)−distr_last_month(label)∥, where distr_last_month(annotation) is a distribution of a specific annotation for a last month. The video system 105 may compare how different a distribution of a review (e.g., by a single reviewer) is from a distribution of a corresponding label (e.g., which is a result of a consensus of annotations of all reviewers). The video system 105 may normalize a difference vector into a scalar result. If the reviewer bias score is small, the reviewer may not be biased on a specific label annotation. If the reviewer bias score is large, the reviewer may be biased for the specific label annotation. In some implementations, the reviewer bias score (ReviewerBias) may be greater when the reviewer is biased on more than one different label annotations.

Figure 1G:
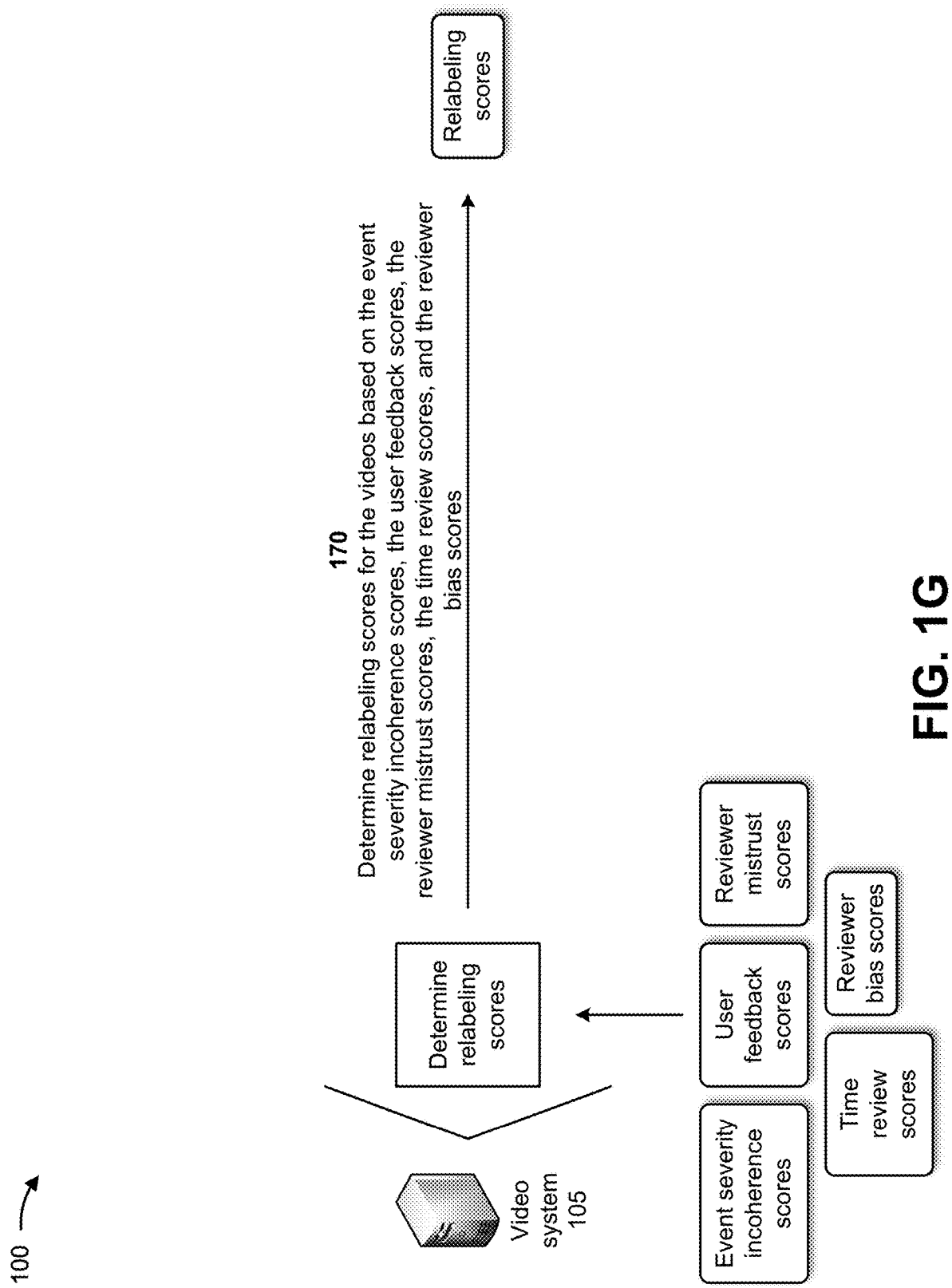

As shown in FIG. 1G, and by reference number 170, the video system 105 may determine relabeling scores for the videos based on the event severity incoherence scores, the user feedback scores, the reviewer mistrust scores, the time review scores, and the reviewer bias scores. For example, when determining the relabeling scores for the videos, the video system 105 may multiply the reviewer mistrust scores, the time review scores, and the reviewer bias scores to obtain first values. The video system 105 may add the event severity incoherence scores, the user feedback scores, the first values, and second values to determine the relabeling scores for the videos. In some implementations, for each video (x), the video system 105 may determine a relabeling score (RelabelingScore), as follows:

$$RelabelingScore(x) = EvSevInc(x) + UsrfScore(x) + $$
$$((1 + RevMistrust(x)) * TimeRevScore(x) * RevBias(x)),$$

where EvSevInc(x) is an event severity incoherence score for the video, UsrfScore(x) is a user feedback score for the video, RevMistrust(x) is a reviewer mistrust score for the video, TimeRevScore(x) is a time review score for the video, and RevBias(x) is a reviewer bias score for the video. The video system 105 may derive the event severity incoherence scores from a combination of the machine learning model scores and a ground truth label from a consensus among the reviewers. The video system 105 may derive the user feedback scores from user feedback on specific videos. The video system 105 may derive the reviewer mistrust scores from the reviewers. The reviewer mistrust scores may provide weights to mistrust associated with reviewers of a specific video. The time review scores may measure of a quantity of time required to perform a video review. The reviewer bias scores may identify biased reviewers involved in a specific video review.

Figure 1H:
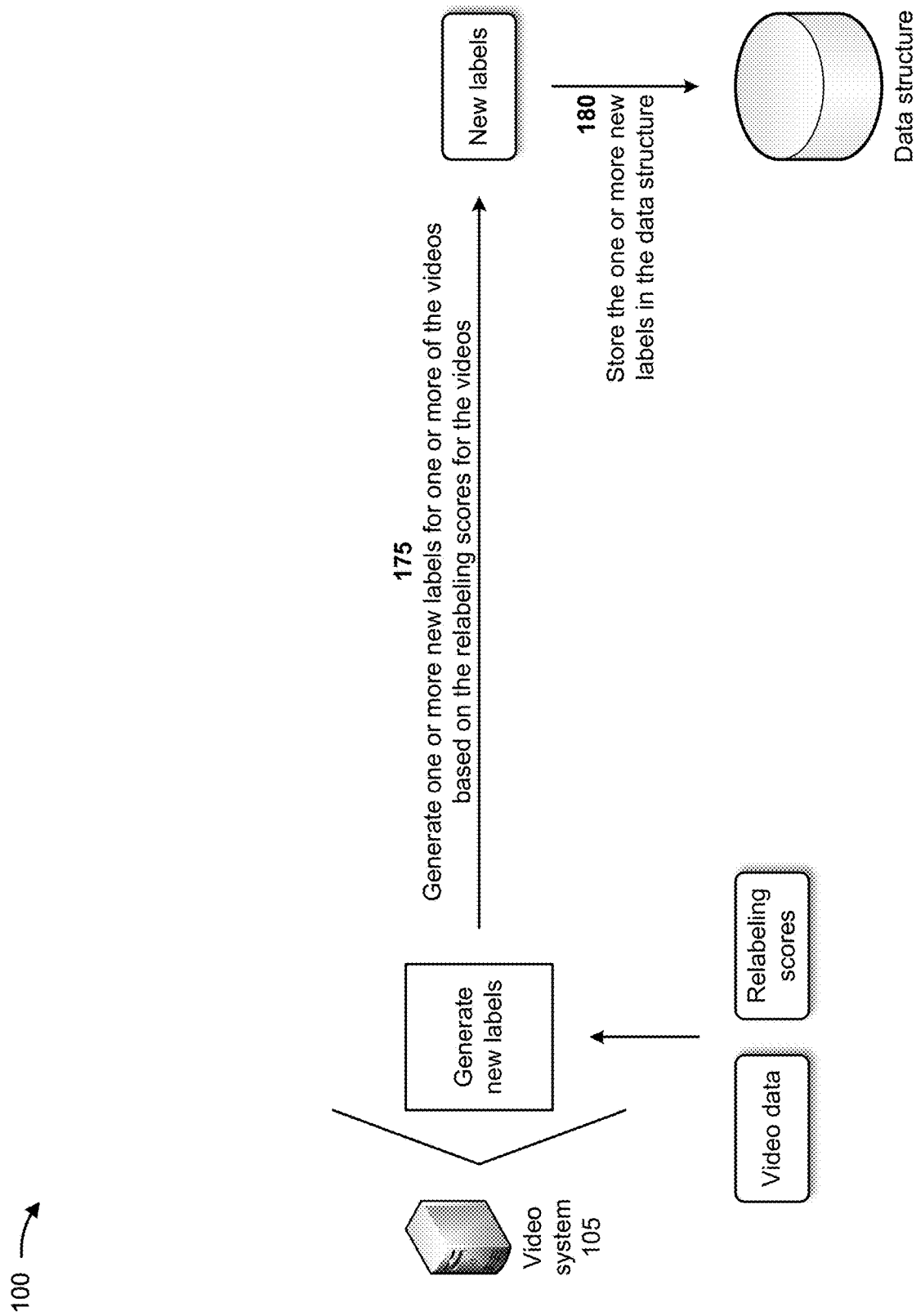

As shown in FIG. 1H, and by reference number 175, the video system 105 may generate one or more new labels for one or more of the videos based on the relabeling scores for the videos. For example, the video system 105 may determine whether the relabeling scores satisfy a score threshold, and may generate the one or more new labels for the one or more of the videos based on one of the relabeling scores satisfying the score threshold. Alternatively, the video system 105 may not generate the one or more new labels for the one or more of the videos based on one of the relabeling scores failing to satisfy the score threshold. In some implementations, the video system 105 may determine that a new label is generated for one of the videos more than a threshold quantity of times (e.g., three, four, and/or the like), and may discard the one of the videos based on determining that a new label is generated for one of the videos more than the threshold quantity of times.

As further shown in FIG. 1H, and by reference number 180, the video system 105 may store the one or more new labels in the data structure. For example, the video system 105 may store labels provided by the reviewers in the data structure. The video system 105 may also store the one or more new labels in the data structure and may discard labels in the data structure that are to be replaced by the one or more new labels. In some implementations, the data structure may be a cloud-based data structure. The video system 105 may consider the one or more new labels to be ground truth labels (e.g., to be a truth of what happened).

Figure 1I:
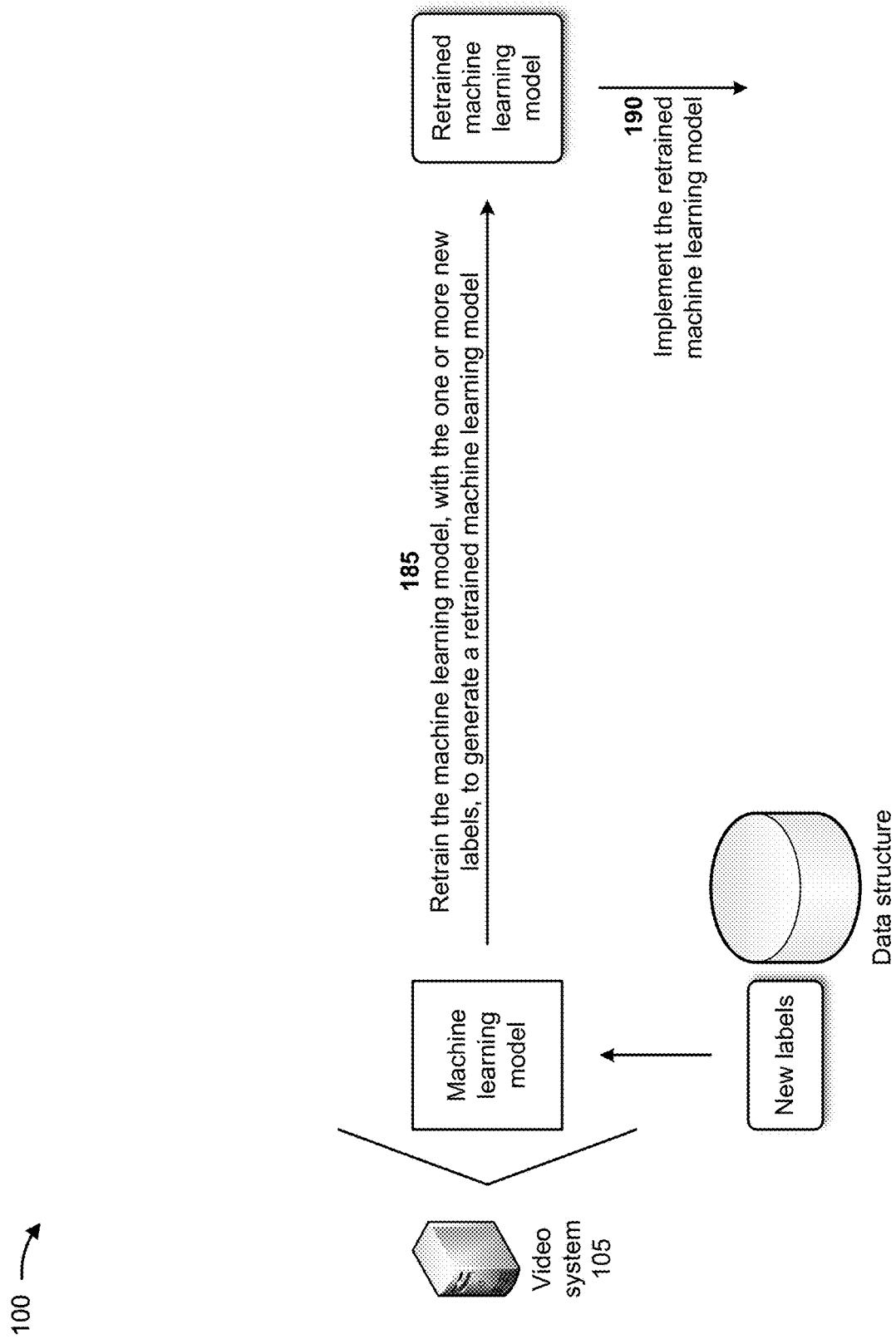

As shown in FIG. 1I, and by reference number 185, the video system 105 may retrain the machine learning model, with the one or more new labels, to generate a retrained machine learning model. For example, the video system 105 may periodically train the machine learning model, with the one or more new labels, to generate the retrained machine learning model. The one or more new labels may improve and/or enhance old labels, and the video system 105 may utilize one or more new labels (e.g., and old labels not replaced by the one or more new labels) to generate a new and improved machine learning model that predicts improved video classifications. In this way, the video system 105 provides a fully automatic and continuous training pipeline for the machine learning model.

As further shown in FIG. 1I, and by reference number 190, the video system 105 may implement the retrained machine learning model. For example, the video system 105 may receive new video data identifying new videos associated with new driving events of the vehicles. The video system 105 may process new video data, with the retrained machine learning model, to generate new classifications for the new driving events identified in the new videos.

In this way, the video system 105 determines when to relabel data, and relabeling data, for a machine learning model. For example, the video system 105 may identify mislabeled data for the machine learning model, may correct the mislabeled data, and may retrain the machine learning model with the correctly labeled data. In some implementations, the video system 105 may determine whether a video, that is already classified and labeled, needs to be reviewed again to correct an initial label (e.g., mislabeling) or to reinforce a label (e.g., due to misclassification). The video system 105 may determine whether the video needs to be reviewed again based on expertise of reviewers providing labels for videos, customer feedback on outputs of the machine learning model, intrinsic label information, and/or the like. The video system 105 may correct mislabeled data based on reviewing the video, and may retrain the machine learning model with the correctly labeled data. Thus, the video system 105 may conserve computing resources, networking resources, and/or other resources that would have otherwise been consumed by failing to generate accurate labels for the machine learning model, failing to quickly iterate through the labeling process which generates more labels for training the machine learning model, generating an erroneous machine learning model based on inaccurate labels, generating erroneous outputs with the erroneous machine learning model, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
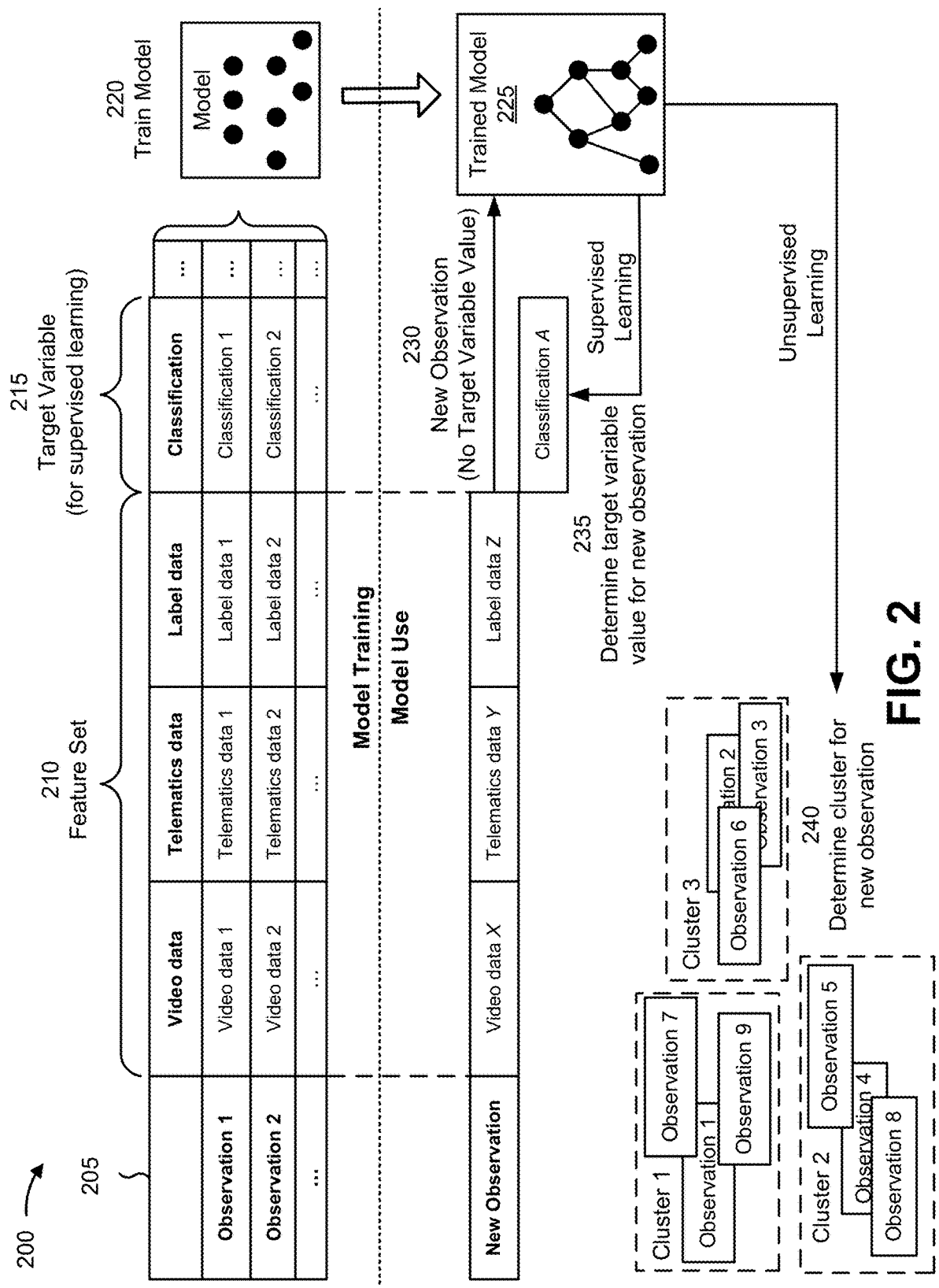
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the video system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the video system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of video data, a second feature of telematics data, a third feature of label data, and so on. As shown, for a first observation, the first feature may have a value of video data 1, the second feature may have a value of telematics data 1, the third feature may have a value of label data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is classification, which has a value of classification 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of telematics data Y, a third feature of label data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of classification A for the target variable of classification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a telematics data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine a classification of video. The machine learning system may enable recognition and/or identification of tens, hundreds, thousands, or millions of features and/or feature values for tens, hundreds, thousands, or millions of observations, thereby increasing accuracy and consistency and reducing delay associated with determining a classification of video relative to requiring computing resources to be allocated for tens, hundreds, or thousands of operators to manually determine a classification of video using the features or feature values.

As indicated above, FIG. 2 is provided as an example. Other examples may differ from what is described in connection with FIG. 2.

Figure 3:
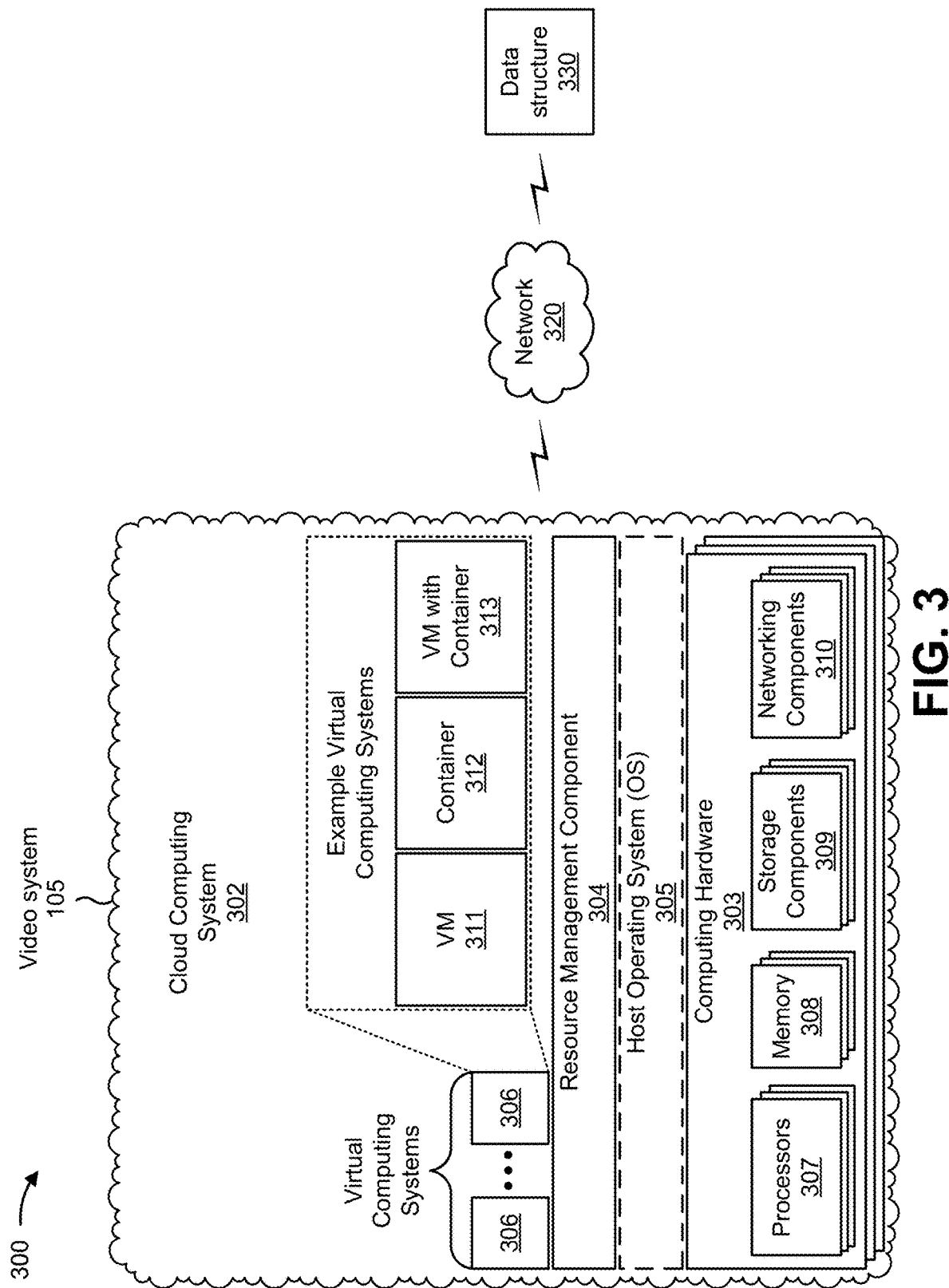
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 105 may include one or more elements 303-313 of the cloud computing system 302, may execute within the cloud computing system 302, and/or may be hosted within the cloud computing system 302, in some implementations, the video system 105 may not be cloud-based (e.g., may be implemented outside of a cloud computing system) or may be partially cloud-based. For example, the video system 105 may include one or more devices that are not part of the cloud computing system 302, such as a device 400 of FIG. 4, which may include a standalone server or another type of computing device. The video system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
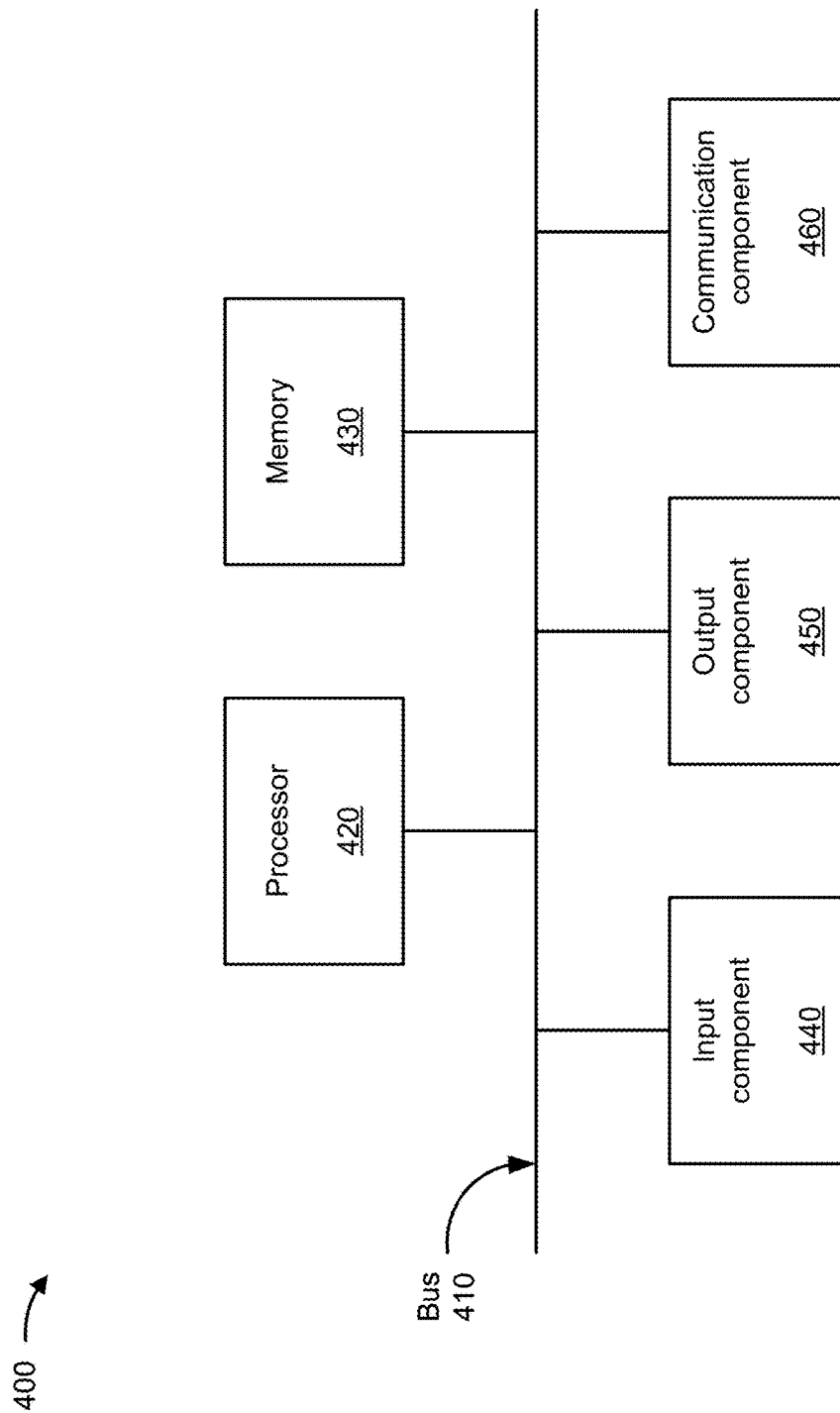
FIG. 4 is a diagram of example components of one or more devices of FIG. 3.

FIG. 4 is a diagram of example components of a device 400, which may correspond to the video system 105 and/or the data structure 330. In some implementations, the video system 105 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
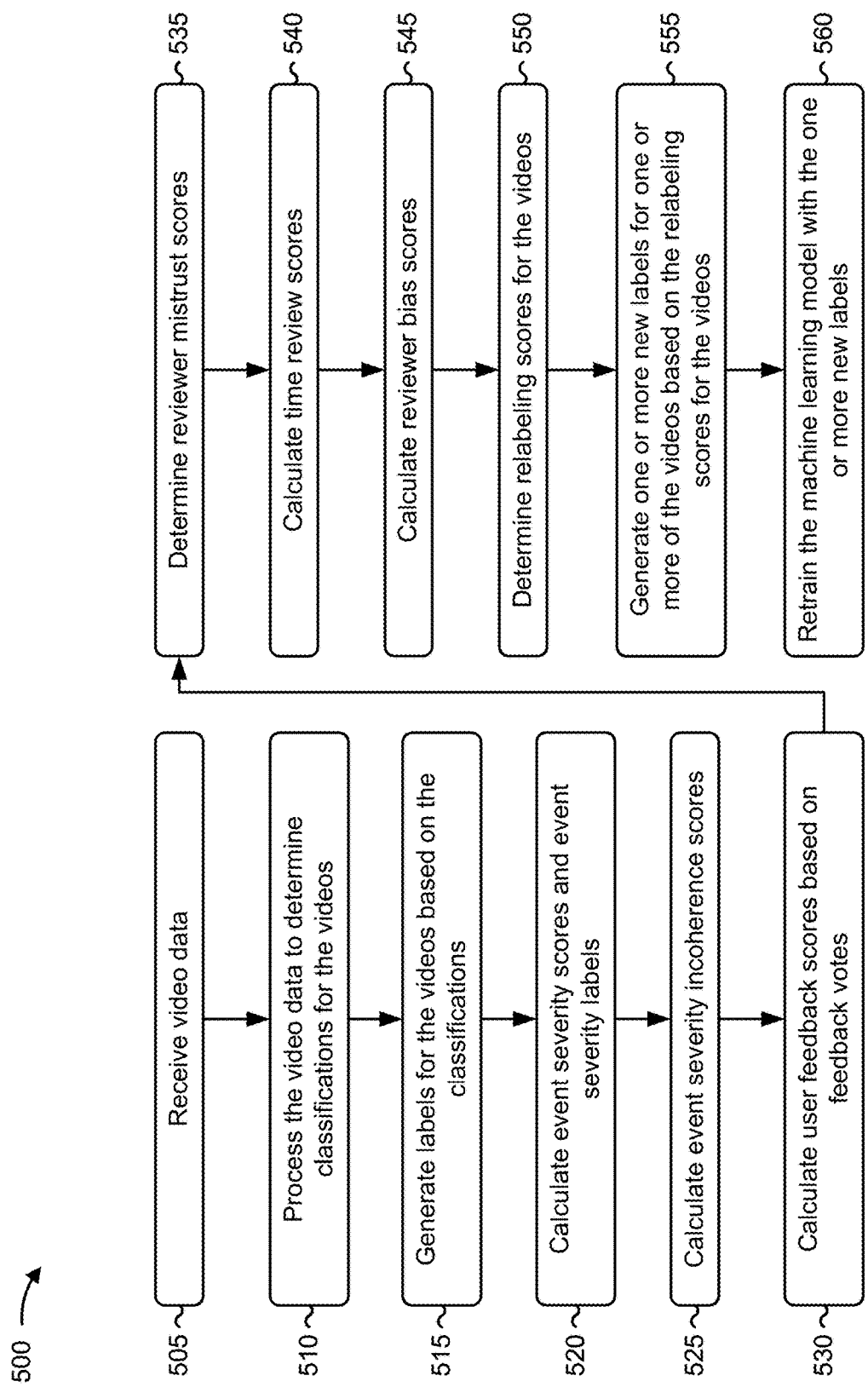
FIG. 5 is a flowchart of an example process for determining when to relabel data, and relabeling data, for a machine learning model.

FIG. 5 depicts a flowchart of an example process 500 for determining when to relabel data, and relabeling data, for a machine learning model. In some implementations, one or more process blocks of FIG. 5 may be performed by a device (e.g., the video system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data (block 505). For example, the device may receive video data identifying videos associated with driving events of vehicles, as described above.

As further shown in FIG. 5, process 500 may include processing the video data to determine classifications for the videos (block 510). For example, the device may process the video data, with a machine learning model, to determine classifications for the videos, as described above.

As further shown in FIG. 5, process 500 may include generating labels for the videos based on the classifications (block 515). For example, the device may generate labels for the videos based on the classifications, as described above.

As further shown in FIG. 5, process 500 may include calculating event severity scores and event severity labels (block 520). For example, the device may calculate event severity scores and event severity labels based on the classifications and the labels, as described above. In some implementations, calculating the event severity scores and the event severity labels based on the classifications and the labels includes calculating the event severity scores based on applying weights to the classifications, and calculating the event severity labels based on applying values to the labels.

As further shown in FIG. 5, process 500 may include calculating event severity incoherence scores (block 525). For example, the device may calculate event severity incoherence scores based on the event severity scores and the event severity labels, as described above. In some implementations, calculating the event severity incoherence scores based on the event severity scores and the event severity labels includes calculating the event severity incoherence scores based on applying a distance measure to the event severity scores and the event severity labels.

As further shown in FIG. 5, process 500 may include calculating user feedback scores based on feedback votes (block 530). For example, the device may calculate user feedback scores based on feedback votes and suggested event severities provided by users associated with the device, as described above. In some implementations, calculating the user feedback scores based on the feedback votes and the suggested event severities includes subtracting the suggested event severities from the event severity labels to obtain first values, dividing the first values by second values to obtain third values, subtracting the feedback votes from fourth values to obtain fifth values, dividing the fifth values by sixth values to obtain seventh values, and multiplying the third values and the seventh values to calculate the user feedback score.

As further shown in FIG. 5, process 500 may include determining reviewer mistrust scores (block 535). For example, the device may determine reviewer mistrust scores based on a quantity of incorrect reviews and a quantity of all reviews provided by reviewers, as described above. In some implementations, determining the reviewer mistrust scores based on the quantity of incorrect reviews and the quantity of all reviews includes dividing the quantity of all reviews by first values to obtain second values, and dividing the quantity of incorrect reviews by the second values to determine the reviewer mistrust scores.

As further shown in FIG. 5, process 500 may include calculating time review scores (block 540). For example, the device may calculate time review scores based on review time distributions associated with reviews provided by the reviewers, as described above. In some implementations, calculating the time review scores based on the review time distributions includes determining model times elapsed to generate the reviews provided by the reviewers, generating the review time distributions based on the model times, and calculating the time review scores based on generating the review time distributions.

As further shown in FIG. 5, process 500 may include calculating reviewer bias scores (block 545). For example, the device may calculate reviewer bias scores based on reviewer label bias and a quantity of the labels, as described above. In some implementations, calculating the reviewer bias scores based on the reviewer label bias and the quantity of the labels includes dividing the reviewer label bias, for each of the reviewers, by the quantity of labels generated by each of the reviewers to generate a first value for each of the reviewers, and adding the first value for each of the reviewers to calculate the reviewer bias scores.

As further shown in FIG. 5, process 500 may include determining relabeling scores for the videos (block 550). For example, the device may determine relabeling scores for the videos based on the event severity incoherence scores, the user feedback scores, the reviewer mistrust scores, the time review scores, and the reviewer bias scores, as described above. In some implementations, determining the relabeling scores for the videos includes multiplying the reviewer mistrust scores, the time review scores, and the reviewer bias scores to obtain first values, and adding the event severity incoherence scores, the user feedback scores, the first values, and second values to determine the relabeling scores for the videos.

As further shown in FIG. 5, process 500 may include generating one or more new labels for one or more of the videos based on the relabeling scores for the videos (block 555). For example, the device may generate one or more new labels for one or more of the videos based on the relabeling scores for the videos, as described above.

As further shown in FIG. 5, process 500 may include retraining the machine learning model with the one or more new labels (block 560). For example, the device may retrain the machine learning model, with the one or more new labels, to generate a retrained machine learning model, as described above.

In some implementations, process 500 includes storing the one or more new labels in a data structure that includes one or more labels, of the labels for the videos, that are not replaced with the one or more new labels. In some implementations, process 500 includes implementing the retrained machine learning model with new video data identifying new videos associated with new driving events of the vehicles.

In some implementations, process 500 includes determining that a new label is generated for one of the videos more than a threshold quantity of times, and discarding the one of the videos based on determining that a new label is generated for one of the videos more than the threshold quantity of times. In some implementations, process 500 includes determining whether the relabeling scores satisfy a score threshold, and generating the one or more new labels for the one or more of the videos includes selectively generating a new label for one of the videos based on one of the relabeling scores satisfying the score threshold, or not generating a new label for one of the videos based on one of the relabeling scores failing to satisfy the score threshold.

In some implementations, process 500 includes determining whether the relabeling scores satisfy a score threshold, and generating the one or more new labels for the one or more of the videos includes generating the one or more new labels for the one or more of the videos based on one or more relabeling scores, associated with the one or more videos, satisfying the score threshold.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data identifying videos associated with driving events of vehicles;
   processing, by the device, the video data, with a machine learning model, to determine classifications for the videos;
   generating, by the device, labels for the videos based on the classifications;
   calculating, by the device, event severity scores and event severity labels based on the classifications and the labels;
   calculating, by the device, event severity incoherence scores based on the event severity scores and the event severity labels;

calculating, by the device, user feedback scores based on feedback votes and suggested event severities provided by users associated with the device;

determining, by the device, reviewer mistrust scores based on a quantity of incorrect reviews and a quantity of all reviews provided by reviewers;

calculating, by the device, time review scores based on review time distributions associated with reviews provided by the reviewers;

calculating, by the device, reviewer bias scores based on reviewer label bias and a quantity of the labels;

determining, by the device, relabeling scores for the videos based on the event severity incoherence scores, the user feedback scores, the reviewer mistrust scores, the time review scores, and the reviewer bias scores;

generating, by the device, one or more new labels for one or more of the videos based on the relabeling scores for the videos; and retraining, by the device, the machine learning model, with the one or more new labels, to generate a retrained machine learning model.

2. The method of claim 1, further comprising:
storing the one or more new labels in a data structure that includes one or more labels, of the labels for the videos, that are not replaced with the one or more new labels.

3. The method of claim 1, further comprising:
implementing the retrained machine learning model with new video data identifying new videos associated with new driving events of the vehicles.

4. The method of claim 1, wherein calculating the event severity scores and the event severity labels based on the classifications and the labels comprises:
calculating the event severity scores based on applying weights to the classifications; and
calculating the event severity labels based on applying values to the labels.

5. The method of claim 1, wherein calculating the event severity incoherence scores based on the event severity scores and the event severity labels comprises:
calculating the event severity incoherence scores based on applying a distance measure to the event severity scores and the event severity labels.

6. The method of claim 1, wherein calculating the user feedback scores based on the feedback votes and the suggested event severities comprises:
subtracting the suggested event severities from the event severity labels to obtain first values;
dividing the first values by second values to obtain third values;
subtracting the feedback votes from fourth values to obtain fifth values;
dividing the fifth values by sixth values to obtain seventh values; and
multiplying the third values and the seventh values to calculate the user feedback score.

7. The method of claim 1, wherein determining the reviewer mistrust scores based on the quantity of incorrect reviews and the quantity of all reviews comprises:
dividing the quantity of all reviews by first values to obtain second values; and
dividing the quantity of incorrect reviews by the second values to determine the reviewer mistrust scores.

8. A device, comprising:
one or more processors configured to:
receive video data identifying videos associated with driving events of vehicles;

process the video data, with a machine learning model, to determine classifications for the videos;

generate labels for the videos based on the classifications;

calculate event severity scores and event severity labels based on the classifications and the labels;

calculate event severity incoherence scores based on the event severity scores and the event severity labels;

calculate user feedback scores based on feedback votes and suggested event severities provided by users associated with the device;

determine reviewer mistrust scores based on a quantity of incorrect reviews and a quantity of all reviews provided by reviewers;

calculate time review scores based on review time distributions associated with reviews provided by the reviewers;

calculate reviewer bias scores based on reviewer label bias and a quantity of the labels;

determine relabeling scores for the videos based on the event severity incoherence scores, the user feedback scores, the reviewer mistrust scores, the time review scores, and the reviewer bias scores;

generate one or more new labels for one or more of the videos based on the relabeling scores for the videos;

retrain the machine learning model, with the one or more new labels, to generate a retrained machine learning model; and implement the retrained machine learning model.

9. The device of claim 8, wherein the one or more processors, to calculate the time review scores based on the review time distributions, are configured to:
determine model times elapsed to generate the reviews provided by the reviewers;
generate the review time distributions based on the model times; and
calculate the time review scores based on generating the review time distributions.

10. The device of claim 8, wherein the one or more processors, to calculate the reviewer bias scores based on the reviewer label bias and the quantity of the labels, are configured to:
divide the reviewer label bias, for each of the reviewers, by the quantity of labels generated by each of the reviewers to generate a first value for each of the reviewers; and
add the first value for each of the reviewers to calculate the reviewer bias scores.

11. The device of claim 8, wherein the one or more processors, to determine the relabeling scores for the videos, are configured to:
multiply the reviewer mistrust scores, the time review scores, and the reviewer bias scores to obtain first values; and
add the event severity incoherence scores, the user feedback scores, the first values, and second values to determine the relabeling scores for the videos.

12. The device of claim 8, wherein the one or more processors are further configured to:
determine that a new label is generated for one of the videos more than a threshold quantity of times; and
discard the one of the videos based on determining that a new label is generated for one of the videos more than the threshold quantity of times.

13. The device of claim 8, wherein the one or more processors are further configured to:
determine whether the relabeling scores satisfy a score threshold,
wherein the one or more processors, to generate the one or more new labels for the one or more of the videos, are configured to:
selectively:
generate a new label for one of the videos based on one of the relabeling scores satisfying the score threshold, or
not generate a new label for one of the videos based on one of the relabeling scores failing to satisfy the score threshold.

14. The device of claim 8, wherein the one or more processors are further configured to:
determine whether the relabeling scores satisfy a score threshold,
wherein the one or more processors, to generate the one or more new labels for the one or more of the videos, are configured to:
generate the one or more new labels for the one or more of the videos based on one or more relabeling scores, associated with the one or more videos, satisfying the score threshold.

15. A non-transitory computer-readable medium storing a set of instructions, the set of instructions comprising:
one or more instructions that, when executed by one or more processors of a device, cause the device to:
receive video data identifying videos associated with driving events of vehicles;
process the video data, with a machine learning model, to determine classifications for the videos;
generate labels for the videos based on the classifications;
calculate event severity scores and event severity labels based on the classifications and the labels;
calculate event severity incoherence scores based on the event severity scores and the event severity labels;
calculate user feedback scores based on feedback votes and suggested event severities provided by users associated with the device;
determine reviewer mistrust scores based on a quantity of incorrect reviews and a quantity of all reviews provided by reviewers;
calculate time review scores based on review time distributions associated with reviews provided by the reviewers;
calculate reviewer bias scores based on reviewer label bias and a quantity of the labels;
determine relabeling scores for the videos based on the event severity incoherence scores, the user feedback scores, the reviewer mistrust scores, the time review scores, and the reviewer bias scores;
generate one or more new labels for one or more of the videos based on the relabeling scores for the videos;
store the one or more new labels in a data structure that includes the labels that are not replaced with the one or more new labels; and
retrain the machine learning model, with the one or more new labels, to generate a retrained machine learning model.

16. The non-transitory computer-readable medium of claim 15, wherein the one or more instructions further cause the device to:
implement the retrained machine learning model with new video data identifying new videos associated with new driving events of the vehicles.

17. The non-transitory computer-readable medium of claim 15, wherein the one or more instructions, that cause the device to calculate the event severity scores and the event severity labels based on the classifications and the labels, cause the device to:
calculate the event severity scores based on applying weights to the classifications; and
calculate the event severity labels based on applying values to the labels.

18. The non-transitory computer-readable medium of claim 15, wherein the one or more instructions, that cause the device to calculate the event severity incoherence scores based on the event severity scores and the event severity labels, cause the device to:
calculate the event severity incoherence scores based on applying a distance measure to the event severity scores and the event severity labels.

19. The non-transitory computer-readable medium of claim 15, wherein the one or more instructions, that cause the device to calculate the user feedback scores based on the feedback votes and the suggested event severities, cause the device to:
subtract the suggested event severities from the event severity labels to obtain first values;
divide the first values by second values to obtain third values;
subtract the feedback votes from fourth values to obtain fifth values;
divide the fifth values by sixth values to obtain seventh values; and
multiply the third values and the seventh values to calculate the user feedback score.

20. The non-transitory computer-readable medium of claim 15, wherein the one or more instructions, that cause the device to determine the reviewer mistrust scores based on the quantity of incorrect reviews and the quantity of all reviews, cause the device to:
divide the quantity of all reviews by first values to obtain second values; and
divide the quantity of incorrect reviews by the second values to determine the reviewer mistrust scores.

* * * * *